United States Patent [19]

Browne

[11] 4,093,500
[45] June 6, 1978

[54] BAG FORMING APPARATUS

[75] Inventor: Thomas J. Browne, Birmingham, Mich.

[73] Assignee: Lehigh Valley Industries, Inc., New York, N.Y.

[21] Appl. No.: 781,778

[22] Filed: Mar. 28, 1977

[51] Int. Cl.² .......................... B26D 5/08; B30B 15/34
[52] U.S. Cl. .................................. 156/510; 93/33 H; 93/DIG. 1; 156/583; 219/243
[58] Field of Search ............... 156/510, 515, 583, 359, 156/367; 219/243; 83/171; 93/33 H, DIG. 1; 53/39, 372, 373

[56] References Cited

U.S. PATENT DOCUMENTS

| 3,496,049 | 2/1970 | Anderson | 156/583 |
| 3,553,059 | 1/1971 | Stohlquist | 156/515 |
| 3,624,349 | 11/1971 | Mayer | 156/515 X |
| 3,671,357 | 6/1972 | Trouilhet | 156/510 X |
| 3,731,054 | 5/1973 | Bair | 156/515 X |
| 3,752,725 | 8/1973 | Freeman | 156/367 |
| 3,753,829 | 8/1973 | Freeman | 156/515 X |
| 4,021,290 | 5/1977 | Smith | 156/510 |

Primary Examiner—William A. Powell
Assistant Examiner—M. G. Wityshyn

[57] ABSTRACT

A portable unit useful as a household appliance for making plastic bags from multi-layered plastic films. The unit comprises a housing which includes a compartment for a roll of multi-layered plastic film, a lid for the housing which, when closed, defines an elongated slot with the housing for the withdrawal of the plastic film and a hinge means between the lid and the housing for closing and opening the lid. A wire element is mounted on the upper front edge of the housing and an electric circuit, including a switch, in said housing is used to energize said wire when the lid is firmly closed. A first insulating strip overlies the wire and a second insulating strip in the lid is adapted to firmly overlie said first insulating strip. The lid also includes a channel and a cutting means slidably mounted in said channel for severing the plastic bags, and a post for actuating the switch when the lid is closed.

16 Claims, 10 Drawing Figures

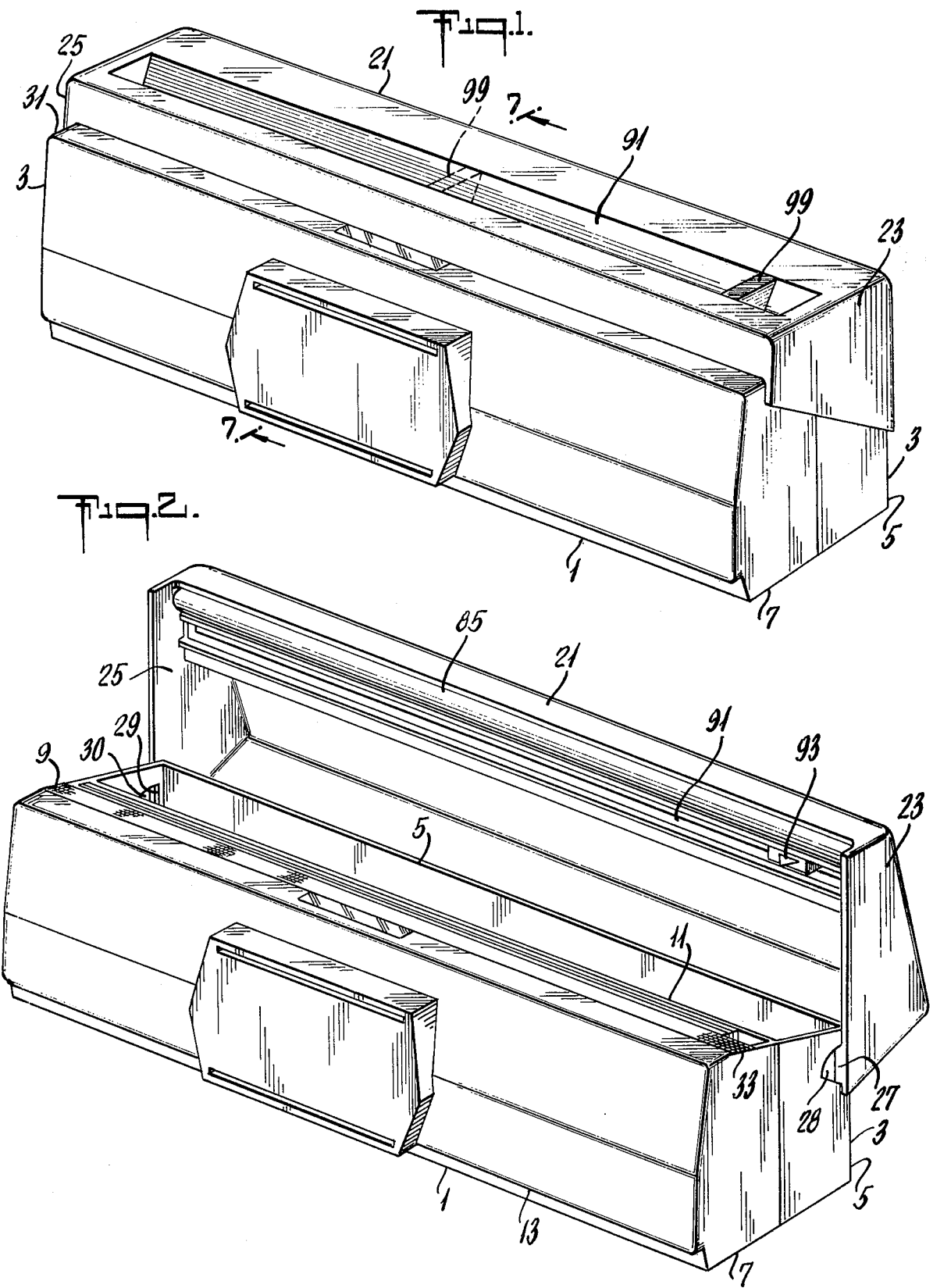

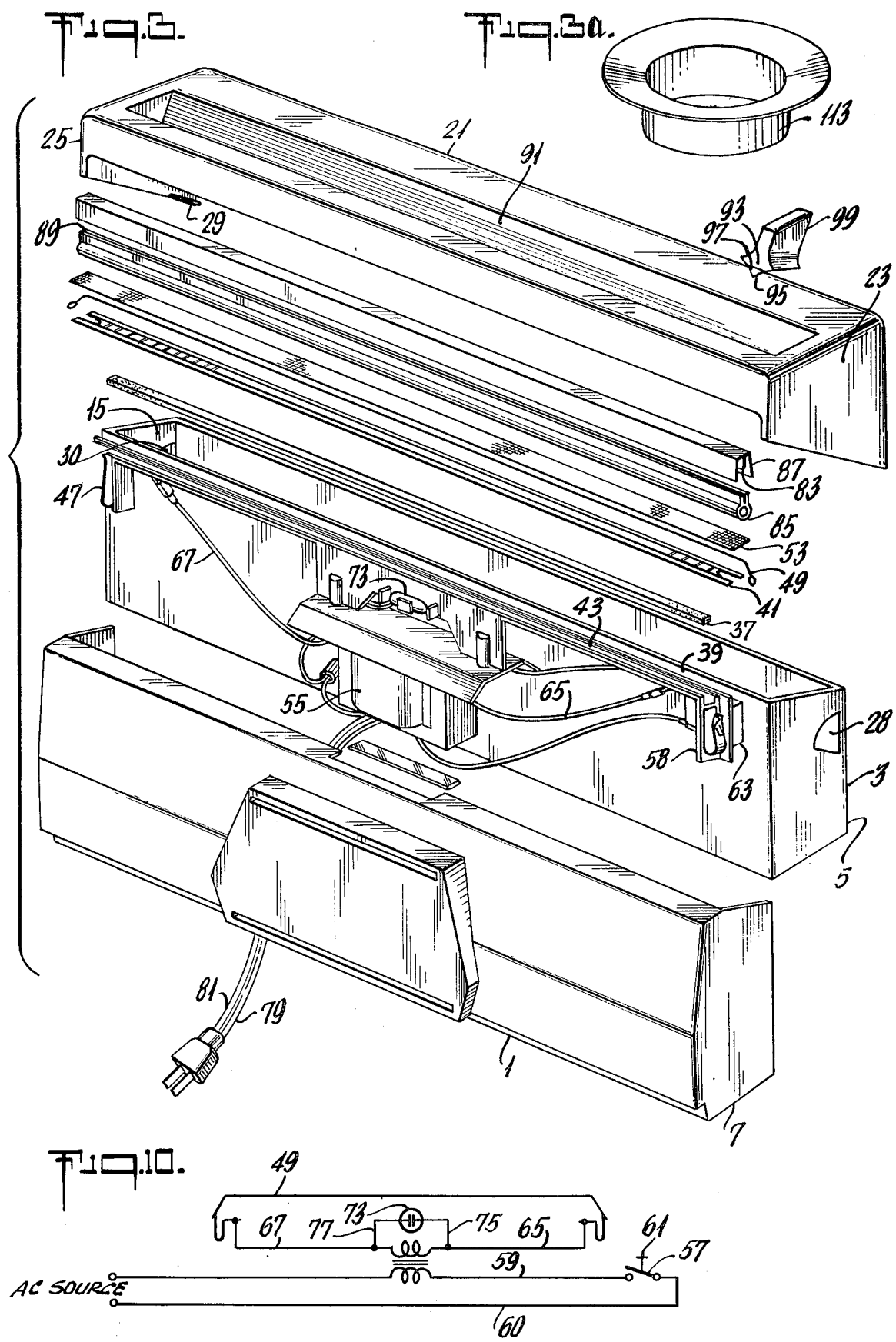

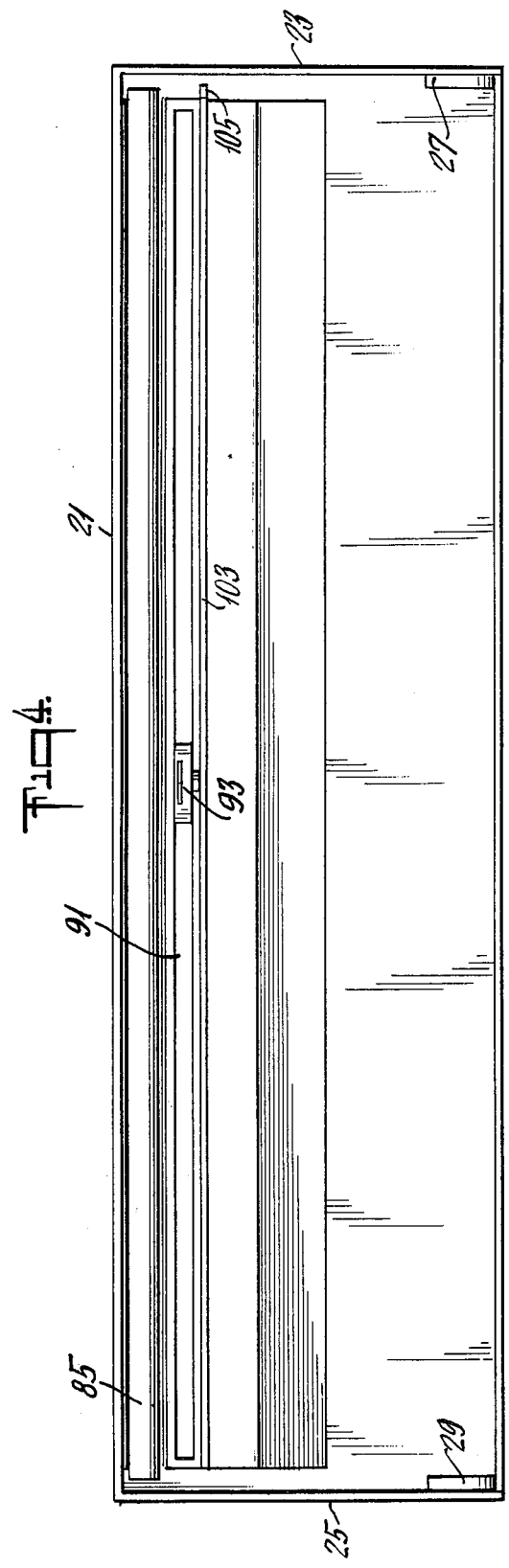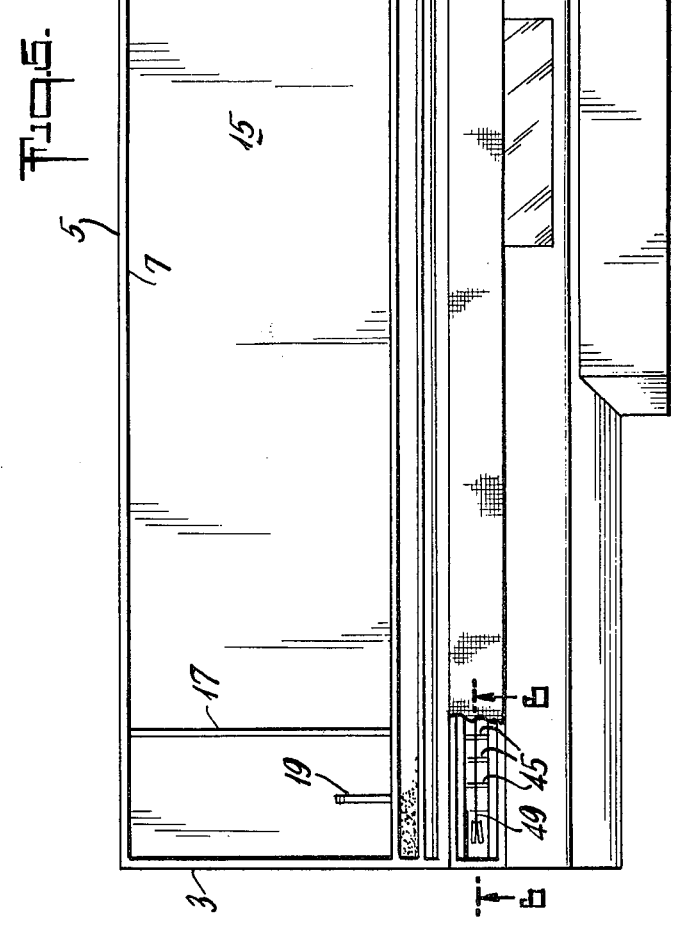

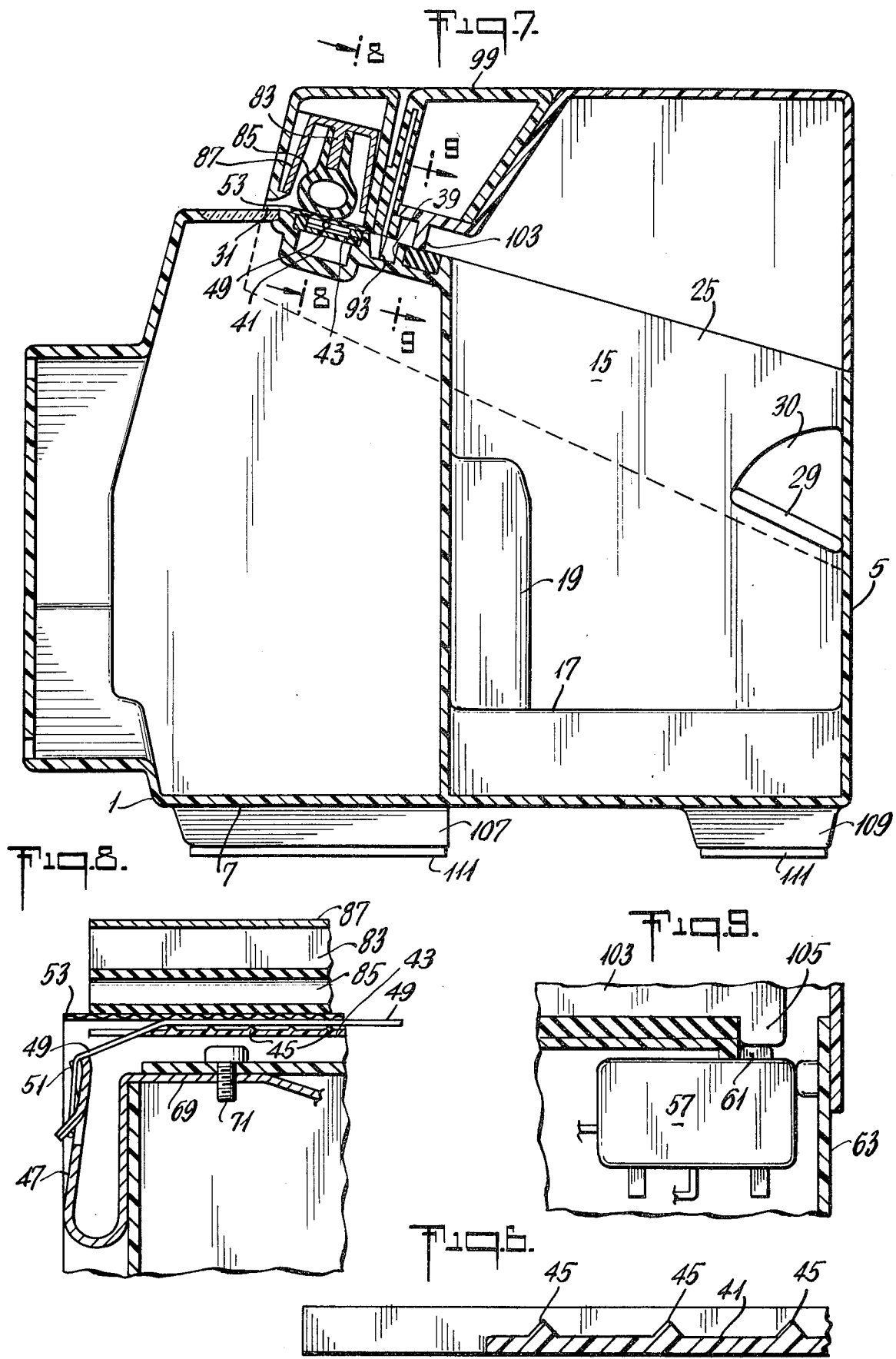

BAG FORMING APPARATUS

BACKGROUND OF THE INVENTION

1. Field of the Invention

The present invention relates to a bag forming unit and is particularly related to an apparatus for making plastic bags from plastic sheet materials such as, for example, polyethylene, polyester, and the like. More specifically, this invention contemplates providing a bag forming unit which is an attractive, portable household appliance and which can be readily and conveniently used by the housewife for making plastic bags of predetermined sizes for wrapping sandwiches and for preserving various foods in order to prevent them from premature drying and from contamination or decay until future consumption.

Still more specifically, the present invention relates to a bag-forming apparatus which includes several unique features designed to eliminate some of the difficulties which have been encountered in the prior art bag-making apparatus.

2. The Prior Art

A variety of plastic bag fabricating units are currently available in the market place and some of these units have found their way into various homes as household appliances. Several such units are described in U.S. Pat. No. 3,354,017 which issued to W. H. Laeger et al on Nov. 21, 1967; U.S. Pat. No. 3,753,829 which issued to Max Freeman on Aug. 21, 1973 and U.S. Pat. No. 3,847,712 which was granted to Robert G. Hubbard on Nov. 12, 1974. As described in Freeman, the early methods of sealing of the adjacent edges of separate plastic sheets were accomplished by "impulse sealing" which involves the simultaneous application of heat and pressure to the plastic sheet materials to form the bags. Impulse sealing, however, requires complicated equipment for closely controlling the exposure time and temperature.

In his aforementioned patent, Freeman describes a plastic bag fabricating, dispensing and sealing unit which utilizes a heated wire for simultaneous sealing and severing the dispensed bags. This unit includes a compartment which houses a cartridge containing a roll of double-layered plastic film formed by folding and winding a single layered sheet along its longitudinal axis. Bags are thus formed having three closed edges and an open edge for receiving the consumer items.

The bag making apparatus described in the aforementioned patent of Laeger et al is basically designed to form plastic bags by dispensing the film from a compartment in the unit and sealing and severing it much in the same manner as the apparatus described by Freeman.

While some of the prior art bag forming units include both means for sealing and for severing the plastic bags from the plastic roll of film, others, such as the apparatus described in the aforementioned Hubbard patent are only equipped with a sealing means. In this type of apparatus, the roll of plastic film, which is sealed along three edges, is dispensed from a compartment within the unit, sealed along its leading open edge and then torn along this edge to sever the bag from the roll of plastic film.

For one reason or another, none of the prior art units have found widespread acceptabiity either due to inconvenience in their use, inherent poor performance characteristics or basic lack of safety features. For example, the apparatus described in the aforementioned Hubbard patent does not include means for severing the bags from the roll of plastic film and the bags are torn manually. On the other hand, the Freeman unit provides a heated wire which is exposed and therefore could cause serious accidental burns to the housewife or children in the household. The aforementioned and other disadvantages of the prior art bag forming units will become more apparent from the ensuing description of the apparatus of this invention.

SUMMARY OF THE INVENTION

In accordance with this invention, a bag-forming apparatus is provided which includes several unique features designed to overcome the aforementioned disadvantages and eliminate the inherent limitations of the prior art units.

The bag forming apparatus of this invention comprises a housing which includes a compartment for a roll of multilayered plastic film which may be securely positioned by means of suitable retaining means in the compartment. The apparatus also comprises a lid secured to the housing by hinged means which, when closed, defines an elongated slot for withdrawing the plastic film from the unit. A wire is uniquely mounted on a rigid base on the upper front edge of housing and an electrical circuit, including a switch in said housing is used for energizing and heating the wire. A post means in the lid is associated with the switch and is designed to actuate the switch when the lid is firmly closed. An insulating strip overlies the wire and protects against exposure of the heated wire to prevent accidental contact therewith.

At its lower face, the lid is provided with an insulating strip fitted in an elongated slot and designed to overlie and firmly press against the insulating strip on the housing when the lid is closed. The lid also comprises a channel which spans the length of the lid, and a cutting means, e.g., a knife, is slidably mounted in said channel which can be manually operated to sever the formed bag from the roll of plastic film.

The foregoing and other unique features of the apparatus of this invention will now be described in detail with particular reference to the various drawings which are attached hereto and which form parts of this application.

DESCRIPTION OF THE DRAWINGS

In the drawings, where like numerals are employed to designate like parts:

FIG. 1 is a perspective view of the bag making apparatus of this invention with its lid closed;

FIG. 2 is a perspective view of the apparatus shown in FIG. 1 but with the lid open;

FIG. 3 is a perspective cutaway view of the apparatus of this invention illustrating its various assemblies and components;

FIG. 3a is a perspective view of a funnel useful for filling of bags produced by the apparatus of this invention.

FIG. 4 is a bottom plan view of the lid;

FIG. 5 is a top plan view of the housing, including the compartment, with the protective insulating layer partially removed to show the wire element;

FIG. 6 is a side sectional view in elevation taken along the line 6—6 in FIG. 5, illustrating the manner of installation of the wire element;

FIG. 7 is a transverse section taken along the line 7—7 in FIG. 1;

FIG. 8 is a sectional view taken on the line 8—8 in FIG. 7;

FIG. 9 is a sectional view taken on the line 9—9 in FIG. 7; and

FIG. 10 is a schematic wiring diagram for the electrical circuit used in the apparatus of this invention.

DESCRIPTION OF THE PREFERRED EMBODIMENT OF THE INVENTION

Referring now to the drawings, and in general to the apparatus shown in FIGS. 1, 2 and 3, there is shown a housing 1, side panels 3, rear panel 5, bottom panel 7 and a front portion 9 defined by an interior wall 11 and an exterior or front wall 13. The side panel 3, the rear panel 5, the bottom panel 7 and the interior wall 11 define a compartment 15 which is a receptacle for a roll of film as will hereinafter be described. The compartment 15 also comprises spaced integral upright flange members 17 extending from the bottom panel 7 for securely positioning the roll of plastic film, and it further includes a pair of upright retaining walls 19 for retaining a cartridge containing the roll of film.

The bag making unit of this invention also comprises a lid 21 having integral side panels 23 and 25 which overlap the side panels 3 as shown in FIGS. 1 and 2. A pair of integral flange members 27 and 29 extend from the interior faces of the side panels 23 and 25 and pivot, respectively, in associated slots 28 and 30 in the side panels 3 of the housing 1 for closing and opening the lid. When the lid is in its fully open position (FIG. 2), the integral flange members 27 and 29 rest flush against the rear panel 5 of the housing.

The rear panel 5 is slightly lower in height than the interior wall 11 so as to define a clearance 31 between the lid 21 and the upper front edge 33 of the housing 1 to permit the withdrawal of the plastic roll of film from the compartment 15 and the housing.

A first longitudinal groove 35 extends along the upper front edge 33 of the housing 1 and a strip of resilient material 37 is adhesively secured in said longitudinal groove 35 (see FIG. 5). The resilient strip 37 may be conveniently selected from foamed plastic materials such as, e.g., polyvinyl chloride foam sealant, or other similar resilient materials.

A second longitudinal groove 39 also extends along the upper front edge 33 of the housing 1 substantially parallel to and coextensive with said first longitudinal groove 35. Both said first and second longitudinal grooves 35 and 39 are adapted to register with respective associated elements in the lower face of the lid 21 during the fabrication and dispensing of the plastic bags as will hereinafter be described.

A heat insulating, generally flat rigid member 41 is fitted into a longitudinal groove or channel 43 extending along the upper front edge 33 of the housing 1. The rigid member 41 comprises spaced integral ridges 45 substantially along its entire length and is secured at both sides of the upper front edge 33 by means of generally U-shaped post terminal 47 (see FIG. 8). A wire heating element 49 extends tautly along the upper front edge 33 on said rigid member 41 as shown in FIGS. 5 and 8. The wire element 49 may be soldered at its respective ends to the post terminals 47 or it may be conveniently secured by winding both ends over the screws 51 as shown in FIG. 8. Alternatively, the wire element 49 may be retained tautly by means of tension springs or any other suitable tensioning means. The wire element 49 is preferably a high resistance wire such as those previously employed in the prior art devices. Most conveniently the wire element may be made from "Nichrome" which is the trademark for Chromal 24 gauge wire manufactured by Malin Company.

Overlying the wire element 49 is an insulating strip 53 of a resilient material such as, for example, fiberglass reinforced Teflon or any other suitable insulating material. The insulating strip 53 protects against accidental burns due to exposure of the heated wire as it is common in some of the prior art type bag-making units.

The provision of the insulating rigid member 41 having the construction hereinbefore described provides a unique heat-insulating space between the wire and the base of the upper front edge 33 of the housing. (see FIG. 6). This prevents heat transfer and possible damage to the plastic apparatus. More significantly, however, this unique manner of installation of the wire element 49 minimizes heat dissipation when the wire is energized and, therefore, the desired severing temperature is attained more rapidly than in the prior art units and the plastic bags may be sealed within a few seconds only.

The electrical circuit employed to energize the wire element 49 is located in the front portion 9 of the housing 1, between the interior wall 11 and the exterior or front wall 13. This circuit includes a transformer 55 whose primary is connected to the switch 57 by means of the primary conductors 59 and 60. The switch 57 which includes a microswitch button 61 is retained by means of a switch retainer 63. The transformer secondary is connected by means of the conductors 65 and 67 to the lateral integral extensions 69 of the post terminals 47 as shown in FIGS. 3 and 8. The lateral integral extensions 69 of the post terminals 47 are themselves rigidly secured to the upper front edge 33 of the housing 1 by means of the screws 71, or by any other suitable means (see FIG. 8).

The electrical circuit also includes a pilot light 73 which is energized by the conductors 75 and 77 which are connected to the transformer secondary. When the microswitch button 61 is activated, as will hereinafter be described, and the lid is firmly closed, the pilot light 73 is also activated thereby indicating that current is flowing through the wire element 49. Once the microswitch button is deactivated, the current flow is interrupted and the pilot light goes off.

The electrical circuit employed herein further includes conductors 79 and 81 which are adapted to be plugged to an external electrical power source.

The lid 21 comprises a longitudinal groove 83 spanning the length of the lower face of the lid and adapted to firmly retain an insulating resilient pressure pad 85 which may be formed of an insulating resilient material such as silicone rubber. In the specific construction depicted in FIG. 3 the longitudinal groove 87 includes a central ridge section 83 and the pressure pad 85 is tubular in form having a longitudinal slot 89 facing said central ridge section 87 and adapted to be slipped thereon and firmly held thereby. This specific construction however is not intended to limit the manner or mode of installation of the pressure pad 85 in the groove 83 as other modes are readily suggested from this description.

When the lid 21 is closed and firmly pressed against the upper front edge 33 of the housing 1, the pressure pad 85 overlies the insulating strip 53 and firmly presses against the wire element 49. Thus the leading edge of the plastic roll of film may be rigidly maintained in position when the plastic bags are being severed from the roll of film.

The lid 21 also comprises a longitudinal slot or channel 91 extending along its length substantially parallel to the longitudinal groove 83, and a cutting means 93 is mounted in said channel 91 adapted to slide freely back and fro through said channels. In the embodiment illustrated in FIG. 3 of the drawings, the cutting means employed herein is a generally V-shaped member defined by the lateral blades 95 and 97 and an apex adapted to slide in the longitudinal groove 39 in the upper front edge 33 of the housing 1 during severing of the plastic bags from the roll of film. The cutting means 93 is conveniently fitted into the handle 99 sized to be conveniently gripped between the thumb and the forefinger to be pushed back and fro in the channel 91 when severing the plastic bags.

The provision of the channel 91 and the cutting means 93 in the lid 21 constitute another unique feature of the bag-making apparatus of this invention and provide an effective and convenient means for severing the plastic bags. Once again, it will be readily appreciated that the aforesaid description of the cutting means suggests other configurations and structures which are obvious to those skilled in the art and which nevertheless fall within the scope of this invention.

Along its lower face, the lid 21 also comprises a longitudinal ridge 103 adapted to engage the resilient strip 37 when the lid is firmly closed (FIGS. 7 and 9). The provision of the longitudinal ridge 103 constitutes yet another unique feature of the apparatus of this invention.

Additionally, the lid 21 comprises an actuating post 105 adapted to engage the microswitch button 61 when the lid is closed and firmly pressed against the upper front edge 33 of the housing.

The housing 1 also comprises a pair of front foot rests 107 and rear foot rests 109 which are covered with suitable mar-proof foot pads 111 in order to prevent marring the surface of the bottom panel of the housing. Also, the bottom panel may include a pair of spaced holes (not shown) adapted to engage with hook means on the kitchen walls for convenience in dispensing the plastic bags from the unit.

The bag-forming apparatus of this invention is also equipped with funnel 113 which may be conveniently inserted into the open edge of the plastic bags to avoid spillage when the bags are being filled with liquid or other materials.

In operation, a roll of multilayered (usually double layered) tubular plastic film which is sealed along its respective longitudinal edges, or a cartridge containing such roll of film, is placed in the compartment 15 and securely retained therein by the spaced upright flange members 17, or the retaining walls 19, as the case may be depending on the size of the roll of film which is used. The plastic roll and the cartridge are of the usual type and variety and hence they are not shown herein.

By pulling the leading open edge of the plastic film, a predetermined length of film is dispensed depending upon the desired size of the bag and the lid 21 is then closed defining the longitudinal slot 31 with the upper front edge 33 of the housing through which the plastic film may be continuously withdrawn. When the lid 21 is pressed firmly against the upper front edge 33, the pressure pad 85 engages the resilient member 53 and firmly presses the wire element 49, and the actuating post 105 engages the microswitch button 61 thereby energizing the electrical circuit and thus heating the wire. Activation of the microswitch button 61 also energizes the pilot light 73 which gives a visual indication of the current flow through the wire element 49. The lid 21 is thus pressed firmly for 3 to 5 seconds until the plastic film is sealed along its leading open edge.

In order to sever the plastic film which has been sealed along its leading edge as aforesaid, the handle 99 of the cutting means 93 is gripped by the hands, usually between the thumb and the forefinger, and moved quickly across the channel 91 thereby engaging the cutting means 93 into the plastic film to sever the bag therefrom. The apex or the blades of the cutting means protrudes into and freely travel through the longitudinal groove 39 for more effective severing action.

Also, while the lid 21 is firmly pressed against the upper front edge 33 of the housing, the ridge 103 engages the longitudinal groove 35 thereby forming a skirt at the trailing edge of the bag to add structural integrity and rigidity thereto.

Thus, a bag is fabricated and dispensed by the apparatus of this invention which is sealed along three edges and which is open along one edge only. In order to fill the bag with liquid or other food material to be stored, the open edge of the film is slipped onto the neck of the funnel 113 and filled to about ½ or 1 inch from the top (open end). The open end of the bag may then be placed between the pressure pad 85 and the insulating strip 53 and the lid 21 closed once again, pressed firmly as aforesaid and sealed to form a completely sealed bag for the storage of the food or other materials.

Thus, in accordance with this invention there is provided a plastic bag forming apparatus which constitutes a convenient household appliance and which includes several safety features designed to eliminate some of the inherently unsafe features of the prior art devices. It may be readily used by plugging the unit into conventional electrical outlets provided at various homes and institutions, and the provision of the transformer in the apparatus facilitates the reduction of voltage from 120 to about 20 or 25 volts, which is amply sufficient for energizing the electrical circuit and heating the wire to the desired severing temperature of the plastic in a matter of seconds.

As it was previously mentioned, the unique manner of installation of the wire element 49 affords maximum and rapid heating of the wire since heat dissipation is virtually minimized. Moreover, since the heated wire is not mounted directly on the housing (usually made of plastic material), heat conduction to the plastic housing is minimized and damage thereto may be avoided.

While the foregoing and other features of the apparatus of this invention have been described in some detail and illustrated in the drawings with some degree of specificity, it must be understood that some revisions and modifications may be made in the construction of the apparatus which are obvious to those skilled in the art from the detailed description of this invention and the accompanying drawings. Such revisions and/or modifications, however, are nevertheless within the spirit and scope of this invention.

What is claimed is:

1. An apparatus for making plastic bags from multilayered tubular plastic film comprising a housing including a front edge portion; a compartment in said housing for said tubular film, a substantially continuous elongated base rigidly secured to and substantially spanning the length of said front edge of the housing, said elongated base having a plurality of spaced integral ridges; a wire element supported by said spaced ridges of said elongated base; a first insulating strip overlying said wire; an electrical circuit including a switch, said electrical circuit having terminals connectable to said switch and to an external power source; means in said lid for actuating said switch when said lid is closed; a second insulating strip in said lid which is substantially coextensive with and overlies said first insulating strip when said lid is closed; an elongated channel in said lid substantially coextensive with and parallel to said second insulating strip and a cutting means slideably mounted in said channel for severing the plastic bags from said tubular film.

2. An apparatus as in claim 1 further including an elongated groove on said front edge of said housing adjacent to said compartment, an elongated resilient strip in said groove and an elongated integral ridge in said lid substantially coextensive with and adapted to press said elongated resilient strip when said lid is closed.

3. An apparatus as in claim 1 wherein said housing includes means for tautly securing said wire in position.

4. An apparatus as in claim 2 wherein said housing includes means for tautly securing said wire in position.

5. An apparatus as in claim 1 wherein at least one of said first and second insulating strips is a resilient material.

6. An apparatus as in claim 2 wherein at least one of said first and second insulating strips is a resilient material.

7. An apparatus as in claim 3 wherein at least one of said first and second insulating strips is a resilient material.

8. An apparatus as in claim 4 wherein at least one of said first and second insulating strips is a resilient material.

9. An apparatus as in claim 1 wherein said compartment comprises a pair of spaced retaining members for securely retaining said multilayered tubular film.

10. An apparatus as in claim 2 wherein said compartment comprises a pair of spaced retaining members for securely retaining said multilayered tubular film.

11. An apparatus as in claim 3 wherein said compartment comprises a pair of spaced retaining members for securely retaining said multilayered tubular film.

12. An apparatus as in claim 4 wherein said compartment comprises a pair of spaced retaining members for securely retaining said multilayered tubular film.

13. An apparatus as in claim 5 wherein said compartment comprises a pair of spaced retaining members for securely retaining said multilayered tubular film.

14. An apparatus as in claim 6 wherein said compartment comprises a pair of spaced retaining members for securely retaining said multilayered tubular film.

15. An apparatus as in claim 7 wherein said compartment comprises a pair of spaced retaining members for securely retaining said multilayered tubular film.

16. An apparatus as in claim 8 wherein said compartment comprises a pair of spaced retaining members for securely retaining said multilayered tubular film.

* * * * *